US006726270B2

(12) United States Patent
Meierhofer

(10) Patent No.: US 6,726,270 B2
(45) Date of Patent: Apr. 27, 2004

(54) VERTICALLY ADJUSTABLE CONVERTIBLE TOP COMPARTMENT FLOOR ON A VEHICLE WITH A FOLDING OR CONVERTIBLE TOP AND METHOD OF MAKING AND USING SAME

(75) Inventor: Walter Meierhofer, Munich (DE)

(73) Assignee: Bayerische Motoren Werke AG, Munich (DE)

( * ) Notice: Subject to any disclaimer, the term of this patent is extended or adjusted under 35 U.S.C. 154(b) by 0 days.

(21) Appl. No.: 10/291,551

(22) Filed: Nov. 12, 2002

(65) Prior Publication Data
US 2003/0090125 A1 May 15, 2003

(30) Foreign Application Priority Data
Nov. 10, 2001 (DE) .......................................... 101 55 308

(51) Int. Cl.[7] .................................................. B60J 7/02
(52) U.S. Cl. ................................... 296/124; 296/107.08
(58) Field of Search ........................... 296/124, 107.08, 296/136

(56) References Cited

U.S. PATENT DOCUMENTS

| 4,969,679 A | * | 11/1990 | Eyb ............................. 296/124 |
| 5,810,413 A | * | 9/1998 | Siring et al. ............. 296/124 X |
| 5,904,395 A | | 5/1999 | Wedin ......................... 296/136 |

FOREIGN PATENT DOCUMENTS

| DE | 3829346 | 3/1990 |
| DE | 19713606 C1 | 4/1998 |
| DE | 29809008 U1 | 6/1999 |
| EP | 0933242 A1 | 8/1999 |

* cited by examiner

Primary Examiner—Joseph D. Pape
(74) Attorney, Agent, or Firm—Crowell & Moring LLP

(57) ABSTRACT

Vertically adjustable folding top compartment floor on a vehicle with a folding or convertible top, which floor is connected by way of foldable side walls with the vehicle body. Two side walls arranged on opposite side areas of the convertible top compartment floor are formed by two wall sections, respectively, which are swivellably connected about a hinge axis. One wall section is swivellable about a connection axis linked to the convertible top compartment floor, and the other wall section is swivellable about a supporting axis linked to the vehicle body.

24 Claims, 1 Drawing Sheet

VERTICALLY ADJUSTABLE CONVERTIBLE TOP COMPARTMENT FLOOR ON A VEHICLE WITH A FOLDING OR CONVERTIBLE TOP AND METHOD OF MAKING AND USING SAME

BACKGROUND AND SUMMARY OF THE INVENTION

This application claims the priority of German Patent Document 101 55 308.0, filed on Nov. 10, 2001, the disclosure of which is expressly incorporated by reference herein.

The invention relates to a vertically adjustable convertible top compartment floor on a vehicle with a folding or convertible top, the floor being connected by foldable side walls with the vehicle body.

A convertible top compartment floor of this type is known from German Patent Document DE 38 29 346 A1, and corresponding U.S. Pat. No. 4,969,679, on a motor vehicle with a top which can be folded back. This folding top compartment floor, when lowered into a low position, forms a receiving space above the folding top compartment floor, into which the opened folding top is to be moved. When, while the folding top is closed, the folding top compartment floor is lifted into a high position, a receiving space is formed under the folding top compartment floor, which receiving space correspondingly enlarges the luggage space situated behind it. The edge areas of the convertible compartment floor are adjoined by walls made of an elastic flexible material which can be pushed together in the vertical direction in an accordion-type manner. The elastic and flexible side walls cannot sufficiently hold the folding top compartment floor in any vertical position.

It is an aspect of the invention to provide a vertically adjustable convertible top compartment floor, as above, which is sufficiently held by way of simple devices in a high and a low position.

This aspect is achieved in that the side walls arranged on opposite areas of the folding top compartment floor are formed by two wall sections, respectively, the wall sections being swivellably connected about a hinge axis, and in that one of the wall sections is swivellable about a connection axis linked to the folding top compartment floor and the other wall section is swivellable about a supporting axis linked to the vehicle body. Advantageous developments of the invention are described below.

The side walls connected with the convertible top compartment floor may in each case be formed by two simple, sufficiently fixed wall sections, for example, made of a plastic material, which are swivellably connected by way of a common hinge axis. In order to permit a larger swivelling angle of the two swivellably connected wall sections of, for example, approximately 180°, the hinge axis may be formed laterally next to the principal plane of the wall sections. The two wall sections, which are connected with one another in a hinge-type manner, are in each case swivellably connected on an edge area facing away from the hinge area, on the one side, with the convertible top compartment floor and, on the other side, with the vehicle body. In the high position and in the low position, the folding top compartment floor can be held in a simple manner. For example, in the high position and in the low position, a respective wall section of the two wall sections connected with one another in a hinge-type manner rests against an assigned stop, and a spring element, such as a simple over-dead-center spring, loads the corresponding wall section against the stop. The over-dead-center spring can be linked to a wall section such that it loads the convertible top compartment floor above a defined vertical position into the high position and below the defined vertical position into the low position.

Other objects, advantages and novel features of the present invention will become apparent from the following detailed description of the invention when considered in conjunction with the accompanying drawings.

DETAILED DESCRIPTION OF THE DRAWINGS

Figure 1:
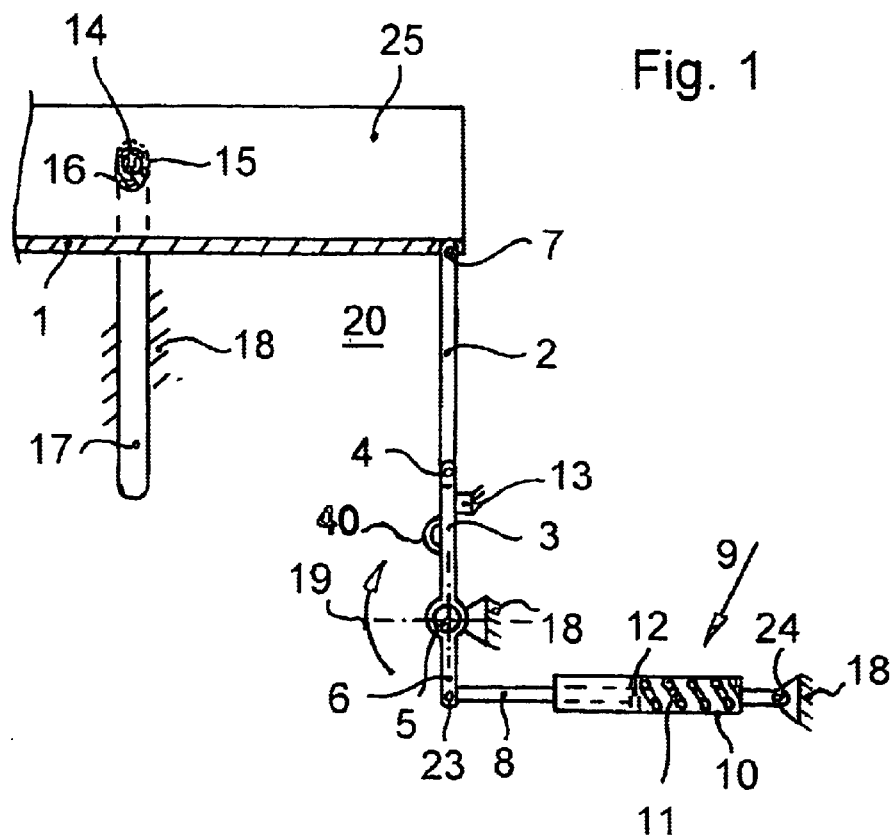
FIG. 1 shows a view of a side area of the convertible top compartment floor lifted into the high position.

The convertible top compartment floor 1, which is illustrated in a simplified fashion by way of a side area in FIG. 1, is vertically adjustable at the two laterally opposite areas in each case by way of two wall sections 2, 3 which are swivellably connected with one another in a common hinge axis 4. The wall section 3, which is at the floor in the illustrated high position of the convertible top compartment floor 1, is swivellable about a vehicle-fixed supporting axis 5 fastened to the vehicle body 18 and has a lever arm 6 which, opposite to the main area of the wall section 3, extends radially with respect to the supporting axis 5. The upper wall section 2 is swivellable about a connection axis 7 connected with the convertible top compartment floor 1. In the illustrated high position of the convertible top compartment floor 1, the two wall sections 2, 3, and the lever arm 6 are situated in an approximately vertical plane. The hinge axis 4, the supporting axis 5, and the connection axis 7 extend parallel to the longitudinal direction of the vehicle.

The piston rod 8 of a spring cylinder 9 is applied to the free end of the lever arm 6 of the wall section 3, the piston rod 8 being swivellable about a swivelling axis 23, which is parallel to the supporting axis 5, connected with the lever arm 6. Swivellable about an axis 24 parallel to the swivelling axis 23, the cylinder 10 is fastened to the vehicle body 18. A pressure spring 11 is axially prestressed in the cylinder 10 of the spring cylinder 9, which pressure spring 11 loads a piston 12 axially toward the outside which is connected with the piston rod 8.

In the illustrated high position, the wall section 3 rests under the force of the pressure spring 11 against a vehicle-body-fixed stop 13. A bolt 14 projects approximately from a lateral central area of the convertible top compartment floor 1 in the driving direction toward the front. The bolt 14 engages in a receiving opening 15 in a sliding pad 16 which is guided in a vertically adjustable manner in a vertical guide 17 constructed on the vehicle body and laterally fixes the convertible top compartment floor.

In the illustrated high position of the convertible top compartment floor 1, the longitudinal axis of the spring cylinder 9 is situated in an approximately horizontal position in the transverse direction of the vehicle.

At the lower wall section 3, the pressure spring 11 causes a torque 19 clockwise about the supporting axis 5. The torque 19 causes a stable resting of the wall section 3 against the stop 13 also in the driving operation of the vehicle, whereby the convertible top compartment floor 1 is held in a stable manner in the high position. In the high position of the convertible top compartment floor 1, the folding or convertible top is closed. Under the convertible top compartment floor 1, a storage space 20 is formed which correspondingly enlarges the luggage space arranged behind it, so that additional or larger objects can be accommodated in the luggage space.

At the lower wall section 3, a grip 40 is fastened by way of which a torque can be caused at the wall section 3 counterclockwise about the supporting axis 5, which swivels the two wall sections 2, 3 in opposite directions and in the process further compresses the pressure spring 10 in the spring cylinder 9 until the longitudinal axis of the spring cylinder 9 extends through the supporting axis 5. When the longitudinal axis of the spring cylinder 9 extends through the supporting axis 5, the convertible top compartment floor 1 will have reached a defined height. When the convertible top compartment floor 1 is above this height, the pressure spring 11 will load the convertible top compartment floor 1 into the high position. In contrast, when the convertible top compartment floor 1 is below the defined height, the pressure spring 11 will load the convertible top compartment floor 1 into a low position. Accordingly, the pressure spring 11 operates as an over-dead-center spring, its dead center being reached when the pressure force of the pressure spring 11 extends through the supporting axis 5.

Figure 2:
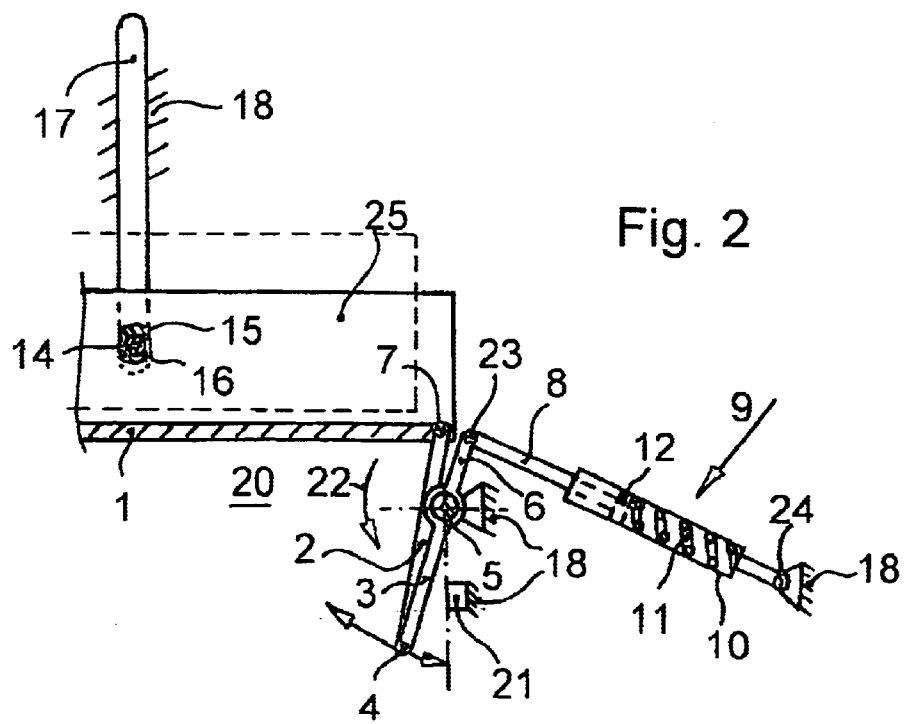
FIG. 2 shows a view corresponding to FIG. 1 of the convertible top compartment floor approaching the low position.

FIG. 2 shows the convertible top compartment floor 1 approaching its low position, in which the wall section 3 under the pressure force of the pressure spring 11 rests in a stable manner against a vehicle-body-fixed stop 21. On the other vehicle side, which is not shown, two wall sections are also provided which, by way of a common hinge axis, are swivellably connected with one another or, by way of a supporting axis, are swivellably connected with the vehicle body or, by way of a connection axis, are swivellably connected with the convertible top compartment floor.

A lowering or lifting of the convertible top compartment floor 1 can take place by the simultaneous swivelling of the grips 40 which in the present case are fastened to the respective lower wall sections 3, in this case, the convertible top compartment floor 1 being adjusted approximately parallel downward or upward. Likewise, a lowering or lifting of the convertible top compartment floor 1 into the low position or the high position may take place in two steps, in which case, first on one side, the respective wall lower section 3 is swivelled by way of the grip 40 connected therewith and subsequently the wall section situated on the other vehicle side is swivelled correspondingly. In this case, the convertible top compartment floor 1 carries out two swivelling movements about the axis of the bolt 14, which laterally supports the convertible top compartment floor 1 in the area of the vertical guide 17.

Between the forward edge area of the convertible top compartment floor 1 and a rearward area of the convertible top material of the folding or convertible top, a covering is provided which is made, for example, of a fabric which may be sewn onto the folding top material and can be snapped, for example, by way of a snap strip to the convertible top compartment floor. Additional coverings made, for example, of a fabric, may be provided between additional edge areas and adjoining walls of the vehicle body or of the folding or convertible top. The coverings prevent objects situated in the luggage space from getting dirty and prevent or make more difficult noise transfer into the vehicle occupant compartment. The convertible top compartment floor forms a stable depositing surface on which a folding or convertible top is to be deposited which can be adjusted manually or by way of a motor.

In a preferred embodiment, the side walls are arranged laterally under the convertible top compartment floor. Likewise, the side walls may also be arranged above the convertible top compartment floor. The lever arm, to which a spring element is applied, may be connected at an arbitrary point with the lower or upper wall section and extend in an arbitrary direction which possibly deviates from the principal plane of the respective wall section. The vertical guide or the bolt engaging in the vertical guide or in a receiving opening in a sliding pad in the vertical guide can also be eliminated. The spring element may be formed by an arbitrary spring, such as a gas pressure spring, which may extend in any direction and load the convertible top compartment floor only into the high position or only into the low position. An elimination of the spring element is also possible. For locking the convertible top compartment floor in the high and in the low position respectively, a locking device may also be provided which, in the respective high or low position releasably locks a wall section or a component connected therewith. The high position and/or low position may also be limited by a stop which interacts with an area of the convertible top compartment floor.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vertically adjustable folding top compartment floor on a vehicle with a folding or convertible top, said floor being connected by foldable side walls with a vehicle body, wherein the side walls arranged on opposite side areas of the folding top compartment floor are formed by two wall sections, respectively, said wall sections being swivellably connected about a hinge axis, wherein one of said wall sections is swivellable about a connection axis linked to the folding top compartment floor and the other wall section is swivellable about a supporting axis linked to the vehicle body, and wherein the compartment floor is guided in an area which is central in a transverse direction of the vehicle in a vertically adjustable manner on the vehicle body.

2. The folding top compartment floor according to claim 1, wherein an over-dead-center spring loads the compartment floor lifted above a defined height into a high position and loads the compartment floor lowered below the defined height into a low position, and wherein, in the high position as well as in the low position, the compartment floor or one of the wall sections rests under a force of the over-dead-center spring against an assigned stop.

3. The folding top compartment floor according to claim 2, wherein the other wall section swivellably fastened to the vehicle body has a lever arm to which the over-dead-center spring is applied.

4. The folding top compartment floor according to claim 3, wherein the lever arm of the other wall section extends at a defined angle with respect to a principal plane of the other wall section approximately radially to the supporting axis.

5. The folding top compartment floor according to claim 3, wherein the other wall section, swivellably fastened to the vehicle body, and the lever arm extend in opposite directions approximately radially away from the supporting axis.

6. The folding top compartment floor according to claim 4, wherein the other wall section, swivellably fastened to the vehicle body, and the lever arm extend in opposite directions approximately radially away from the supporting axis.

7. The folding top compartment floor according claim 1, wherein the two wall sections are arranged below the convertible top compartment floor.

8. The folding top compartment floor according claim 2, wherein the two wall sections are arranged below the convertible top compartment floor.

9. The folding top compartment floor according to claim 3, wherein the lever arm extends upward from the supporting axis in the high position of the compartment floor and downward in the low position of the compartment floor.

10. The folding top compartment floor according to claim 4, wherein the lever arm extends upward from the supporting axis in the high position of the compartment floor and downward in the low position of the compartment floor.

11. The folding top compartment floor according to claim 5, wherein the lever arm extends upward from the supporting axis in the high position of the compartment floor and downward in the low position of the compartment floor.

12. The folding top compartment floor according to claim 2, wherein the over-dead-center spring is a pressure spring which is arranged in a cylinder and which loads an axially adjustable piston rod, which is swivellably linked to a lever arm of the other wall section, and wherein the cylinder is swivellably fastened to the vehicle body.

13. The folding top compartment floor according to claim 3, wherein the over-dead-center spring is a pressure spring which is arranged in a cylinder and which loads an axially adjustable piston rod, which is swivellably linked to the lever arm of the other wall section, and wherein the cylinder is swivellably fastened to the vehicle body.

14. The folding top compartment floor according to claim 4, wherein the over-dead-center spring is a pressure spring which is arranged in a cylinder and which loads an axially adjustable piston rod, which is swivellably linked to the lever arm of the other wall section, and wherein the cylinder is swivellably fastened to the vehicle body.

15. The folding top compartment floor according to claim 10, wherein the over-dead-center spring is a pressure spring which is arranged in a cylinder and which loads an axially adjustable piston rod, which is swivellably linked to the lever arm of the other wall section, and wherein the cylinder is swivellably fastened to the vehicle body.

16. The folding top compartment floor according to claim 1, wherein a bolt projects from the compartment floor in a longitudinal direction of the vehicle, said bolt engaging in a vertical guide constructed on the vehicle body or in a receiving opening of a sliding pad which is vertically adjustable in the vertical guide.

17. The folding top compartment according to claim 1, wherein a grip is connected with the other wall section swivellably connected to the vehicle body, by which a torque about the supporting axis is to be caused at the other wall section, in use.

18. The folding top compartment according to claim 2, wherein a grip is connected with the other wall section swivellably connected to the vehicle body, by which a torque about the supporting axis is to be caused at the other wall section, in use.

19. The folding top compartment according to claim 3, wherein a grip is connected with the other wall section swivellably connected to the vehicle body, by which a torque about the supporting axis is to be caused at the other wall section, in use.

20. The folding top compartment according to claim 7, wherein a grip is connected with the other wall section swivellably connected to the vehicle body, by which a torque about the supporting axis is to be caused at the other wall section, in use.

21. The folding top compartment according to claim 1, wherein a grip is connected with the other wall section swivellably connected to the vehicle body, by which a torque about the supporting axis is to be caused at the other wall section, in use.

22. A convertible top assembly for a vehicle, comprising:

a convertible top a vertically adjustable convertible top compartment floor, and foldable side walls connecting the floor with a vehicle body, two of said side walls being arranged on opposite side regions of the floor, each of the side walls including two wall sections, wherein the wall sections are swivellably connected about a hinge axis, a first of said wall sections being swivellably connected to the floor and a second of the wall sections being swivellable about a supporting axis connected to the vehicle body, and wherein the compartment floor is guided in an area which is central in a transverse direction of the vehicle in a vertically adjustable manner on the vehicle body.

23. The assembly of claim 22, wherein a spring operatively biases the floor into a high position and a low position.

24. The assembly of claim 23, wherein the spring operatively biases one of the wall sections about an axis, in a first range of positions, the spring biasing one of the wall sections in a clockwise manner and, in a second range of positions, the spring biasing in a counter-clockwise manner.

* * * * *